(12) United States Patent
Takahashi et al.

(10) Patent No.: US 9,761,895 B2
(45) Date of Patent: Sep. 12, 2017

(54) CELL STACK DEVICE, FUEL CELL MODULE, FUEL CELL DEVICE, AND METHOD OF FABRICATING CELL STACK DEVICE

(71) Applicant: KYOCERA Corporation, Kyoto-shi, Kyoto (JP)

(72) Inventors: Naruto Takahashi, Kirishima (JP); Takashi Ono, Kirishima (JP)

(73) Assignee: KYOCERA CORPORATION, Kyoto-Shi (JP)

( * ) Notice: Subject to any disclaimer, the term of this patent is extended or adjusted under 35 U.S.C. 154(b) by 198 days.

(21) Appl. No.: 14/360,654

(22) PCT Filed: Sep. 29, 2012

(86) PCT No.: PCT/JP2012/075270
§ 371 (c)(1),
(2) Date: May 27, 2014

(87) PCT Pub. No.: WO2013/080644
PCT Pub. Date: Jun. 6, 2013

(65) Prior Publication Data
US 2015/0030956 A1   Jan. 29, 2015

(30) Foreign Application Priority Data
Nov. 28, 2011   (JP) ................. 2011-259096

(51) Int. Cl.
*H01M 8/00*   (2016.01)
*H01M 8/04082*   (2016.01)
(Continued)

(52) U.S. Cl.
CPC ... *H01M 8/04201* (2013.01); *H01M 8/04388* (2013.01); *H01M 8/04395* (2013.01);
(Continued)

(58) Field of Classification Search
CPC ..... H01M 2008/1293; H01M 8/04201; H01M 8/04388; H01M 8/04395; H01M 8/04432;
(Continued)

(56) References Cited

U.S. PATENT DOCUMENTS

2010/0167154 A1   7/2010   Ono
2012/0028135 A1*  2/2012   Ohashi ................. B62D 25/20
                                                 429/400

FOREIGN PATENT DOCUMENTS

JP   2005056671 A   3/2005
JP   2006086018 A   3/2006
(Continued)

OTHER PUBLICATIONS

English abstract of JP 2007227162 A dated Sep. 6, 2007.
(Continued)

*Primary Examiner* — Patrick Ryan
*Assistant Examiner* — Ben Lewis
(74) *Attorney, Agent, or Firm* — Viering, Jentschura & Partner mbB

(57) ABSTRACT

[Object] To provide a cell stack device, the power generation efficiency of which is improved, and a fuel cell module and a fuel cell device that include the cell stack device.
[Solution] A cell stack device 1 includes a cell stack 2 that includes a plurality of fuel cells 3 electrically connected to one another and arranged, the fuel cells 3 that each includes a gas channel through which a reactant gas flows. In the cell stack device 1, the fuel cells 3 of the cell stack 2 are provided in the form of fuel cell groups that each include an arbitrary number of the fuel cells 3. In the cell stack device 1, the fuel cell groups are arranged such that average pressure loss values of the fuel cells 3 of the fuel cell groups increase sequentially from a central portion to an end portion side in
(Continued)

a fuel cell 3 arrangement direction. Thus, the power generation efficiency of the cell stack device 1 can be improved.

2 Claims, 2 Drawing Sheets

(51) Int. Cl.
*H01M 8/2465* (2016.01)
*H01M 8/0438* (2016.01)
*H01M 8/24* (2016.01)
*H01M 8/2425* (2016.01)
*H01M 8/1246* (2016.01)
*H01M 8/124* (2016.01)
*H01M 8/2475* (2016.01)

(52) U.S. Cl.
CPC ......... *H01M 8/04432* (2013.01); *H01M 8/24* (2013.01); *H01M 8/2425* (2013.01); *H01M 8/2465* (2013.01); *H01M 8/1246* (2013.01); *H01M 8/2475* (2013.01); *H01M 2008/1293* (2013.01); *Y02E 60/50* (2013.01); *Y02E 60/525* (2013.01); *Y02P 70/56* (2015.11)

(58) Field of Classification Search
CPC .... H01M 8/1246; H01M 8/24; H01M 8/2425; H01M 8/2465; H01M 8/2475; Y02E 60/521; Y02E 60/525
See application file for complete search history.

(56) References Cited

FOREIGN PATENT DOCUMENTS

| JP | 2007048609 A | | 2/2007 | |
| JP | 2007059377 A | | 3/2007 | |
| JP | 2007-227162 | * | 9/2007 | .............. H01M 8/04 |
| JP | 2007227162 A | | 9/2007 | |
| JP | 2008084683 A | | 4/2008 | |
| JP | 2009117221 A | | 5/2009 | |
| JP | 2009170229 A | | 7/2009 | |
| JP | 2009-181823 | * | 8/2009 | .............. H01M 8/24 |
| JP | 2009181823 A | | 8/2009 | |
| JP | 2009266458 A | | 11/2009 | |
| JP | 2010146783 A | | 7/2010 | |

OTHER PUBLICATIONS

English abstract of JP 2009117221 A dated May 28, 2009.
English abstract of JP 2009181823 A dated Aug. 13, 2009.
English abstract of JP 2010146783 A dated Jul. 1, 2010.
English abstract of JP 2009266458 A dated Nov. 12, 2009.
English abstract of JP 2007048609 A dated Feb. 22, 2007.
English abstract of JP 2008084683 A dated Apr. 10, 2008.
International Search Report issued in the corresponding PCT application No. PCT/JP2012/075270, dated Nov. 6, 2012, 4 pages.
Search Report issued for European application No. 12853520.0 of May 13, 2015.

* cited by examiner (a)

(b)

CELL STACK DEVICE, FUEL CELL MODULE, FUEL CELL DEVICE, AND METHOD OF FABRICATING CELL STACK DEVICE

TECHNICAL FIELD

The present invention relates to a cell stack device that includes a plurality of fuel cells that are arranged, a fuel cell module, a fuel cell device, and a method of fabricating a cell stack device.

BACKGROUND ART

Nowadays, various fuel cell devices equipped with cell stacks are proposed as next generation energy (see, for example, Patent Literature 1). In such a cell stack, a plurality of fuel cells are electrically connected in series to one another. With the fuel cells, power can be obtained by using a fuel gas (hydrogen containing gas) and air (oxygen containing gas).

Such a fuel cell device includes a cell stack device that includes the fuel cells that are arranged. The amount of reactant gas supplied to the fuel cells may vary between the fuel cells positioned at a central portion and end portions in a fuel cell arrangement direction. This may degrade the power generation performance. In particular, the temperature of the fuel cells positioned at the central portion in the fuel cell arrangement direction may increase compared to that of the fuel cells positioned on the end portion sides. This may cause a problem in that a pressure loss increases in gas channels.

Thus, a fuel cell is proposed, for example, in Patent Literature 2. In Patent Literature 2, the sectional areas of gas channels of the fuel cells disposed at a central portion in a fuel cell stacking direction are larger than those of the fuel cells disposed on a gas supply side.

CITATION LIST

Patent Literature

PTL 1: Japanese Unexamined Patent Application Publication No. 2007-59377

PTL 2: Japanese Unexamined Patent Application Publication No. 2008-84683

SUMMARY OF INVENTION

Technical Problem

Regarding the fuel cells described in the above-described Patent Literature 2, it is required that a plurality of types of the fuel cells, the sizes of gas channels of which are different from one another, be fabricated. Thus, more improvement is needed from the viewpoint of improvement of production efficiency.

Usually, it is difficult to fabricate all the fuel cells of the cell stack without variations. Thus, there is a problem in that the power generation performance of the cell stack device is degraded by arbitrarily arranging the fuel cells, the pressure losses of which are different from one another.

Accordingly, an object of the present invention is to provide a cell stack device, a fuel cell module, and a fuel cell device, the power generation performance of which can be improved, and to provide a method of fabricating the cell stack device.

Solution to Problem

A cell stack device according to the present invention includes a cell stack that includes a plurality of fuel cells electrically connected to one another and arranged. The fuel cells each include a gas channel through which a reactant gas flows. In the cell stack of the cell stack device, the fuel cells are provided in a form of fuel cell groups that each include an arbitrary number of the fuel cells. In the cell stack device, the fuel cell groups are arranged such that average pressure loss values of the fuel cells of the fuel cell groups increase sequentially from a central portion to an end portion side in a fuel cell arrangement direction.

A fuel cell module according to the present invention includes the above-described cell stack device and a housing in which the cell stack device is housed.

A fuel cell device according to the present invention includes the above-described fuel cell module, an auxiliary device to operate the fuel cell module, and an exterior casing in which the fuel cell module and the auxiliary device are housed.

A method of fabricating a cell stack device according to the present invention includes the steps of fabricating a plurality of fuel cells that each include a gas channel through which a reactant gas flows, measuring a pressure loss of each of the fuel cells having been fabricated, grouping the plurality of fuel cells into a plurality of fuel cell groups in accordance with the measured pressure loss values, and forming a cell stack by arranging the fuel cell groups, into which the fuel cells are grouped, such that average pressure loss values of the fuel cell groups increase sequentially from a central portion to an end portion side in a fuel cell arrangement direction.

Advantageous Effects of Invention

The cell stack device according to the present invention includes the cell stack that includes the plurality of fuel cells electrically connected to one another. The fuel cells are grouped into the fuel cell groups, and each of the fuel cell groups includes an arbitrary number of the fuel cells. The fuel cell groups are arranged such that the average pressure loss values of the fuel cells of the fuel cell groups increase sequentially from the central portion to the end portion side in the fuel cell arrangement direction. Thus, the flow rate of the reactant gas supplied to the fuel cells can be uniform, and the power generation performance can be improved.

The fuel cell module according to the present invention includes the above-described cell stack device. Thus, the power generation performance of the fuel cell module can be improved.

The fuel cell device according to the present invention includes the above-described fuel cell module, the auxiliary device to operate the fuel cell module, and the exterior casing in which the fuel cell module and the auxiliary device are housed. Thus, the power generation performance of the fuel cell device can be improved.

Furthermore, the cell stack device according to the present invention is fabricated by the above described steps. Thus, the cell stack device, in which the fuel cell groups are arranged such that the average pressure loss values of the fuel cells of the fuel cell groups increase sequentially from the central portion to the end portion side in the fuel cell arrangement direction, can be easily fabricated.

that is a side view and view (b) that is an enlarged plan view of selected parts of the cell stack device illustrated in view (a).

Figure 2:
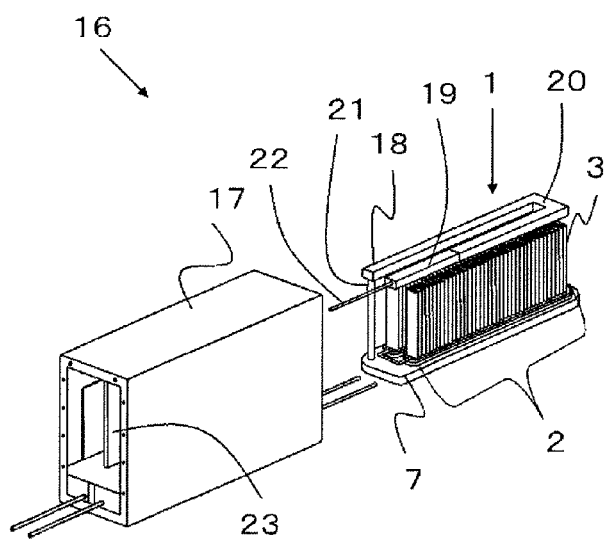

FIG. 2 is an external perspective view illustrating an example of a fuel cell module according to the present embodiment.

Figure 3:
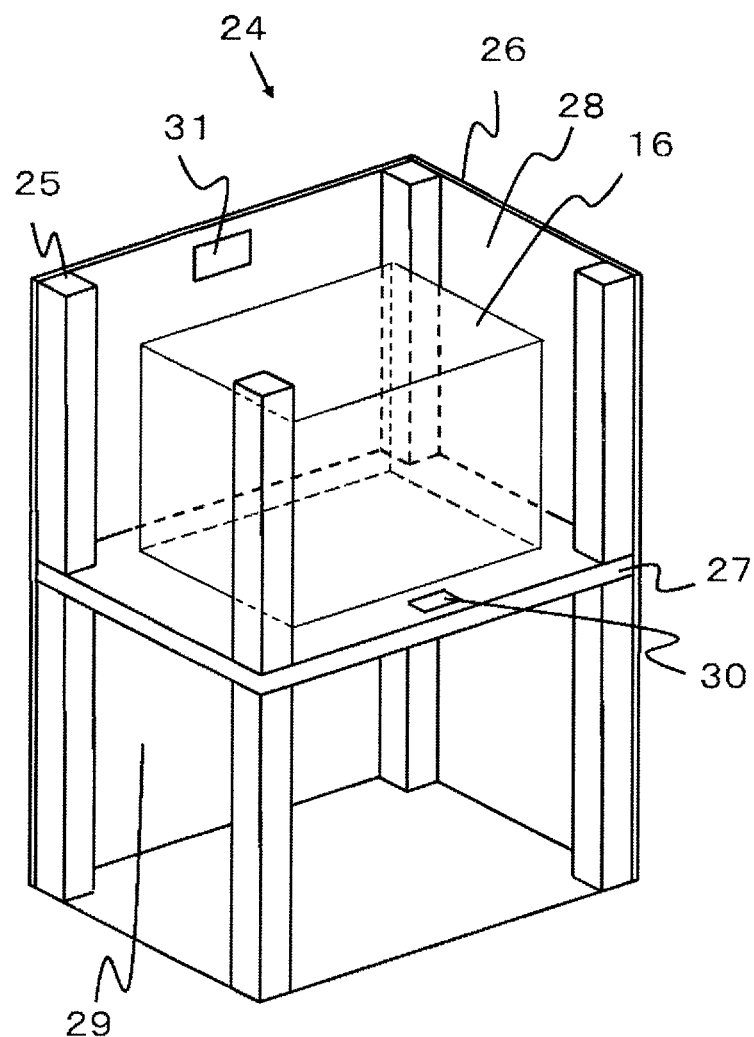

FIG. 3 is an exploded perspective view illustrating an example of a fuel cell device according to the present embodiment.

DESCRIPTION OF EMBODIMENTS

Figure 1:
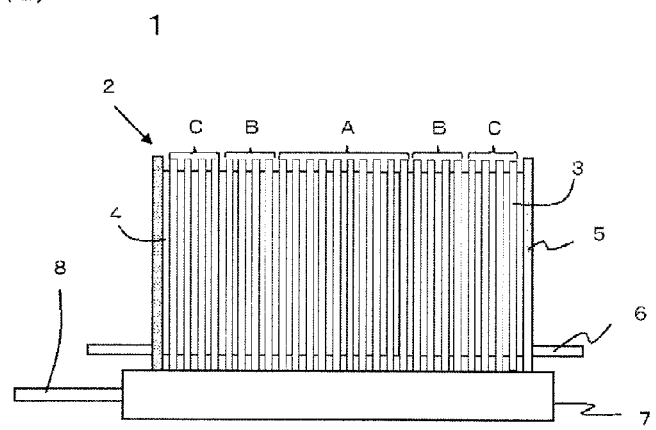
FIG. 1 includes views of an example of a cell stack device according to an embodiment, the views including view (a)
Figure 1:
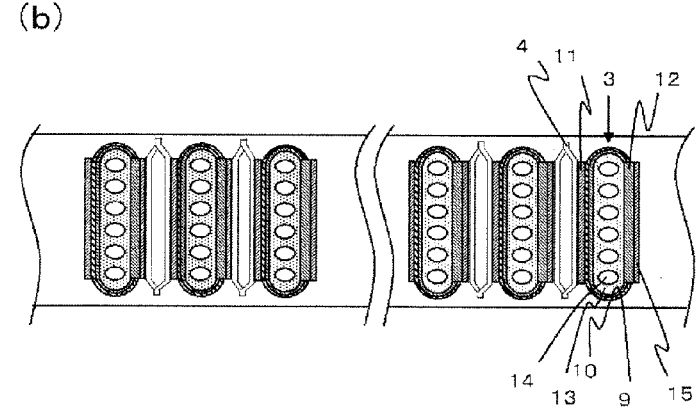

FIG. 1 includes views of an example of a cell stack device according to an embodiment, the views including view (a) that is a side view of a cell stack device 1 and view (b) that is an enlarged plan view of selected parts of the cell stack device 1 illustrated in view (a). In FIG. 1 and the other drawings, the same reference numerals denote the same elements.

The cell stack device 1 includes a cell stack 2 that includes a plurality of column-shaped fuel cells 3 electrically connected in series to one another. The fuel cells 3 are arranged with a current collecting member 4 disposed between any one of the plurality of fuel cells 3 and the adjacent fuel cell 3 of the plurality of fuel cells 3. Each of the fuel cells 3 illustrated in FIG. 1 includes an electrically conductive support body 13 having a flat section. The electrically conductive support body 13 includes a plurality of gas channels 14 therein and a pair of flat surfaces that oppose each other. A fuel electrode layer 9, which serves as an inner electrode layer, a solid electrolyte layer 10, and an air electrode layer 11, which serves as an outer electrode layer, are sequentially stacked on one of the flat surfaces of the electrically conductive support body 13. An interconnector 12 is stacked on part of the other flat surface where the air electrode layer 11 is not formed. A p-type semiconductor layer 15 may be provided on an outer surface of the interconnector 12. When the current collecting member 4 is connected to the interconnector 12 through the p-type semiconductor layer 15, the current collecting member 4 and the interconnector 12 are in ohmic contact with each other. This can reduce a voltage drop, and accordingly, degradation of the current collecting performance can be effectively suppressed. The p-type semiconductor layer 15 can be provided on an outer surface of the air electrode layer 11.

A lower end of each of the fuel cells 3 of the cell stack 2 is secured to a manifold 7 by a joining material such as a glass sealant. The manifold 7 is used to supply a reactant gas to each of the fuel cells 3 through the gas channels 14. In the example of the cell stack device 1 illustrated in FIG. 1, a hydrogen containing gas (fuel gas) as a reactant gas is supplied to the gas channels 14 through the manifold 7. A reactant gas supply pipe 8, through which the reactant gas is supplied to the manifold 7, is connected to a side surface of the manifold 7.

Lower ends of elastically deformable electrically conductive members 5 are secured to the manifold 7 so as to clamp the cell stack 2 from both ends in a fuel cell 3 arrangement direction with the current collecting members 4 interposed therebetween. Here, current feeding units 6 are provided to the electrically conductive members 5 illustrated in FIG. 1 so as to extend outward in the fuel cell 3 arrangement direction. The current feeding units 6 feed currents generated by power generation in the cell stack 2 (fuel cells 3).

In the above-described cell stack device 1, fuel gas exhausted through the gas channels 14 (excess fuel gas) can be burned on an upper end portion side of the fuel cells 3. This allows the temperature of the fuel cells 3 to be increased, and accordingly, start-up of the cell stack device 1 to be accelerated.

The components of each of the fuel cells 3 illustrated in FIG. 1 are described below.

The fuel electrode layer 9 can use a generally known fuel electrode layer. The fuel electrode layer 9 can be formed of a porous electrically conductive ceramic, for example, $ZrO_2$, in which a rare earth element forms a solid solution (referred to as stabilized zirconia), and Ni and/or NiO.

The solid electrolyte layer 10 needs to function as an electrolyte that serves as a bridge for electrons between the electrodes and has a gas blocking property that prevents leakage of the fuel gas and the oxygen containing gas. Thus, the solid electrolyte layer 10 is formed of $ZrO_2$, in which 3 to 15 mole % of a rare earth element forms a solid solution. The solid electrolyte layer 10 may be formed of another material or the like as long as the material has the above described characteristics.

The material of the air electrode layer 11 is not particularly limited as long as the material is generally used. For example, the air electrode layer 11 can be formed of an electrically conductive ceramic made of a so-called $ABO_3$-type perovskite-type oxide. The air electrode layer 11 needs to have a gas permeability. The open porosity of the air electrode layer 11 is preferably equal to or greater than 20%, and is particularly preferably in a range from 30 to 50%.

The interconnector 12 can be formed of an electrically conductive ceramic. Since the interconnector 12 is exposed to the fuel gas (hydrogen containing gas) and an oxygen containing gas (air or the like), the interconnector 12 needs to have reduction resistance and oxidation resistance. Thus, the interconnector 12 is preferably formed of a lanthanum chromite-based perovskite-type oxide ($LaCrO_3$ based oxide). The interconnector 12 needs to be dense so as to prevent leakage of the fuel gas, which flows through the plurality of gas channels 14 formed in the electrically conductive support body 13, and the oxygen containing gas, which flows outside the electrically conductive support body 13. The interconnector 12 preferably has a relative density of equal to or greater than 93%, and particularly preferably has a relative density of equal to or greater than 95%.

The electrically conductive support body 13 needs to have gas permeability so as to allow the fuel gas to pass therethrough and permeate into the fuel electrode layer 9. Furthermore, the electrically conductive support body 13 needs to be electrically conductive so as to collect currents through the interconnector 12. Thus, it is required that the material, which satisfies the above-described requirements, is selected for the electrically conductive support body 13, and the electrically conductive support body 13 can be formed of, for example, an electrically conductive ceramic, a cermet, or the like.

When fabricating the fuel cells 3, in the case where the electrically conductive support body 13 is formed by co-firing along with the fuel electrode layer 9 or the solid electrolyte layer 10, the electrically conductive support body 13 is preferably formed of an iron group metal component and a specific rare earth oxide (such as $Y_2O_3$ or $Yb_2O_3$). The open porosity of the electrically conductive support body 13 is preferably equal to or greater than 30% and is particularly preferably in a range from 35 to 50% so that the electrically conductive support body 13 has a required gas permeability. In addition, the electric conductivity of the electrically conductive support body 13 is preferably equal to or greater than 300 S/cm and is particularly preferably equal to or greater than 440 S/cm.

Examples of the p-type semiconductor layer 15 can include a layer formed of a transition-metal perovskite type oxide. Specifically, the p-type semiconductor layer 15 can be formed of a material having a greater electron conductivity than that of the lanthanum chromite-based perovskite-type oxide ($LaCrO_3$ based oxide) that forms the interconnector 12, for example, a p-type semiconductor ceramic formed of at least one of, for example, an $LaMnO_3$ based oxide, an $LaFeO_3$ based oxide, and an $LaCoO_3$ based oxide in which Mn, Fe, and Co exist in the B sites. In general, the thickness of such a p-type semiconductor layer 15 is preferably in a range from 30 to 100 μm.

Although it is not illustrated, an intermediate layer can be provided between the solid electrolyte layer 10 and the air electrode layer 11. The intermediate layer reinforces joining of the solid electrolyte layer 10 and the air electrode layer 11 to each other and suppresses the formation of a reaction layer having a high electrical resistance through reaction of the components of the solid electrolyte layer 10 and the air electrode layer 11 with each other.

Here, the intermediate layer can be formed of a material having a composition that contains Ce (cerium) and another rare earth element. This composition preferably satisfies, for example, the following expression:

$$(CeO_2)_{1-x}(REO_{1.5})_x \qquad (1)$$

where RE is at least one of Sm, Y, Yb, and Gd, and x is a number that satisfies $0 < x \leq 0.3$.

Furthermore, from the viewpoint of reduction of electrical resistance, Sm or Gd is preferably used as RE. For example, $CeO_2$, in which 10 to 20 mole % of $SmO_{1.5}$ or $GdO_{1.5}$ forms a solid solution, is preferable.

Furthermore, the intermediate layer can have a two-layer structure so as to firmly join the solid electrolyte layer 10 and the air electrode layer 11 to each other and further suppress the formation of a reaction layer having a high electrical resistance through reaction of the components of the solid electrolyte layer 10 and the air electrode layer 11 with each other.

Although it is not illustrated, an adhesion layer can be provided between the interconnector 12 and the electrically conductive support body 13 so as to, for example, reduce the difference in coefficients of thermal expansion between the interconnector 12 and the electrically conductive support body 13.

The adhesion layer can use a material, the composition of which is similar to that of the fuel electrode layer 9, and be formed of, for example, $ZrO_2$, in which a rare earth element such as YSZ forms a solid solution (referred to as stabilized zirconia), and Ni and/or NiO. The volume ratio of $ZrO_2$, in which a rare earth element forms a solid solution, and Ni and/or NiO is preferably in a range from 40:60 to 60:40.

In a cell stack that includes a plurality of fuel cells that are arranged, it is known that the temperature increases at a central portion in the fuel cell arrangement direction (may be simply referred to as the central portion of the cell stack hereafter), resulting in variation in temperature between the central portion and end portions of the cell stack. Due to this temperature variation, the amount of fuel gas supplied to the individual fuel cells varies between the central portion and the end portions of the cell stack. This may lead to degradation of the power generation performance.

Furthermore, it is difficult to fabricate all the fuel cells 3 of the cell stack 2 without variations. Thus, there is a problem in that the power generation performance is degraded by arbitrarily arranging the fuel cells 3, the pressure losses of which are different from one another.

For this reason, in the cell stack device 1 according to the present embodiment, an arbitrary number of the fuel cells 3 are grouped into a fuel cell group, and a plurality of fuel cell groups are formed in the cell stack 2. The fuel cell groups of a single cell stack 2 are arranged such that the average pressure loss values of the fuel cells 3 of the fuel cell groups (may be referred to as the average pressure losses hereafter) increase sequentially from the central portion to each of the end portions of the cell stack 2.

When describing this with reference to the cell stack device 1 illustrated in FIG. 1, the cell stack 2 includes: fuel cell groups C that each include four fuel cells 3 and are positioned at the respective end portions; fuel cell groups B that each include four fuel cells 3 and are adjacent to the respective fuel cell groups C; and a fuel cell group A that includes ten fuel cells 3 and is positioned at the central portion. The average pressure losses of fuel cells 3 of the fuel cell groups satisfy the following relationships: fuel cell group A < fuel cell group B < fuel cell group C. In other words, the fuel cell group A of the lowest average pressure loss neighbors on both sides the fuel cell groups B of the second lowest average pressure loss, and the fuel cell groups B neighbor the respective fuel cell groups C of the third lowest average pressure loss. With this arrangement, the amount of the fuel gas supplied to the fuel cells 3 of the cell stack 2 during power generation becomes more uniform, and accordingly, degradation of the power generation performance can be suppressed.

The fuel cell groups of the cell stack 2 can be appropriately changed in accordance with the number of fuel cells 3 included in the cell stack 2. Regarding the types of the fuel cell groups of the cell stack 2, preferably, the fuel cells 3 are grouped into three or more types of the cell groups, and the whole cell stack includes five to fifteen groups by appropriately arranging the cell groups. In this case, the whole cell stack may include five to fifteen fuel cell groups arranged such that the same type fuel cell groups are arranged laterally symmetrically about the central portion of the cell stack 2. In the example illustrated in FIG. 1, a total of five groups are arranged and each of the five groups belongs to a corresponding one of the three types of groups.

Although in the cell stack device 1 illustrated in FIG. 1, the fuel cell groups of the cell stack 2 are laterally symmetrical about the central portion of the cell stack 2, the cell groups are not necessarily laterally symmetrically arranged and the number of the fuel cells 3 of each of the fuel cell groups may be appropriately changed. However, from the viewpoint of improvement of the power generation performance of the cell stack 2, the numbers of the fuel cell groups laterally symmetrical with one another about the central portion of the cell stack 2 are preferably the same and the numbers of the fuel cells 3 of the fuel cell groups laterally symmetrical with one another about the central portion of the cell stack 2 are preferably the same.

Steps of fabricating the above-described cell stack 2 are described below. Initially, the plurality of fuel cells 3 of the cell stack 2 are fabricated. Next, the pressure losses of all of the fabricated fuel cells 3 are measured.

Specifically, for example, a pressure loss measurement member provided with a gas supply port and a slit that conforms to the outer shape of the fuel cell 3 is prepared. Each of the fuel cells 3 is secured to the pressure loss measurement member. A specified flow rate of a fluid such as air is supplied to each of the fuel cells 3 through the above-described pressure loss measurement member, and the differential pressure between the pressure at the gas supply port of the above-described pressure loss measurement member and the atmospheric pressure is measured by a fine differential pressure gauge. By doing this, the pressure loss of each of the fuel cells 3 can be measured.

When measuring the pressure losses of the fuel cells 3 of the cell stack 2 that has been fabricated, the pressure losses may be measured by disconnecting each of the fuel cells 3 from the cell stack 2. Alternatively, the pressure loss of one of the fuel cell 3, which is a target for the pressure loss measurement, may be measured by the following method: the fuel cells 3 except for the target fuel cell 3 are covered with caps or the like so that the flows of the gas through the gas channels 14 of the fuel cells 3 are blocked. In this case, for example, the pressure of the fuel gas supplied to the manifold 7 may be regarded as the above-described pressure at the gas supply port.

Also in this case, whether or not the cell stack 2 includes a plurality of fuel cell groups, the average pressure losses of which are different from one another, is determined as follows: the pressure loss of each of the fuel cells 3 of the cell stack 2 is measured; and when the pressure loss of one of the fuel cells 3 is clearly different from that of one of the adjacent fuel cells 3 and there is a little difference between the one fuel cell and the other adjacent fuel cell 3, the boundary between the one fuel cell 3 and the adjacent fuel cell 3, the pressure loss of which is clearly different from the one fuel cell 3, is concluded as a boundary between the fuel cell groups. This process is repeated, and whether or not the cell stack 2 includes a plurality of fuel cell groups, the average pressure losses of which are different from one another, can be concluded.

Next, the fuel cells 3 are classified into a plurality of classes in accordance with the pressure losses of the fuel cells 3. The classes are set for respective specified ranges of pressure losses. The specified ranges of pressure losses can be appropriately set in accordance with the size of the fuel cells 3 themselves, the size of the gas channels 14, or the like. The number of classes can be appropriately set in accordance with the number of the fuel cells 3 included in the cell stack 2 or the like. For example, three to ten classes can be set in the cell stack 2.

Next, the fuel cell groups are formed of arbitrary numbers of fuel cells having been classified into the classes. Thus, the fuel cell groups grouped in accordance with the pressure losses can be formed. In so doing, by averaging the pressure losses of the arbitrary numbers of the fuel cells 3, the average pressure losses of the fuel cells 3 of the fuel cell groups can be obtained.

The fuel cell groups grouped in accordance with the pressure losses are arranged such that the pressure losses of the fuel cell groups increase sequentially from the central portion to the end portions in the fuel cell 3 arrangement direction. Specifically, the fuel cell groups are sequentially arranged in accordance with the number of the fuel cell groups of the cell stack 2 such that the fuel cell group, the average pressure loss of which is the lowest, is arranged at the central portion of the cell stack 2, the fuel cell groups, the average pressure losses of which are the second lowest, are arranged adjacent to the fuel cell group, the average pressure loss of which is the lowest, and then the fuel cell groups, the average pressure losses of which are the third lowest, are arranged adjacent to the fuel cell groups, the average pressure losses of which are the second lowest. In each of the fuel cell groups, the fuel cells 3 are not particularly necessarily arranged in the order of the pressure losses. In other words, in each of the fuel cell groups, the fuel cells 3 may be arbitrarily arranged.

Here, the gas supply amount is significantly affected by the temperature of the fuel cells 3 at the central portion of the cell stack 2. Thus, the number of the fuel cells 3 of the fuel cell group at the central portion of the cell stack 2 is preferably greater than the numbers of the fuel cells 3 of the other fuel cell groups. This can suppress degradation of the power generation performance. The numbers of the fuel cells 3 of the fuel cell groups may be decreased from the central portion to the end portions of the cell stack 2.

In the case where the total number of the fuel cells 3 of the cell stack 2 is an even number, each of the fuel cell groups preferably includes an even number of fuel cells 3. In the case where the total number of the fuel cells 3 of the cell stack 2 is an odd number, the fuel cell group at the central portion of the cell stack 2 preferably includes an odd number of fuel cells 3 and the other fuel cell groups preferably include even numbers of the fuel cells 3.

In the cell stack device 1 according to the present embodiment fabricated by the above-described method, the flow rate of the reactant gas supplied to the fuel cells 3 can be uniform, and the power generation performance can be improved.

FIG. 2 is an external perspective view illustrating an example of a fuel cell module (may be referred to as the module hereafter) that includes the cell stack device 1 according to the present embodiment.

In a module 16 illustrated in FIG. 2, the above-described cell stack device 1 is housed in a housing 17.

In FIG. 2, a reformer 18 is disposed above the cell stacks 2. For obtaining the fuel gas used in power generation in the fuel cells 3, the reformer 18 reforms raw fuel such as natural gas or kerosene supplied through a raw fuel supply pipe 22 and produces the fuel gas. Preferably, steam reforming, which is an efficient reforming reaction, can be performed with the reformer 18, and accordingly, the reformer 18 includes a vaporizing unit 19 that vaporizes water and a reforming unit 20 in which a reforming catalyst (not illustrated) for reforming the raw fuel into the fuel gas is disposed. The fuel gas produced by the reforming unit 20 is supplied to the manifold 7 through a fuel gas circulation pipe 21, and then supplied to the gas channels provided in the fuel cells 3 through the manifold 7. The structure of the cell stack device 1 can be appropriately changed in accordance with the type or the shape of the fuel cells 3. For example, the cell stack device 1 can include the reforming unit 18.

In FIG. 2, parts of the housing 17 (front and rear surfaces) are removed, and the cell stack device 1 to be housed in the housing is moved rearward from the housing 17. Here, in the module 16 illustrated in FIG. 2, the cell stack device 1 can be slid into and housed in the housing 17.

A reactant gas introduction member 23 is disposed between the cell stacks 2, which are disposed parallel to each other on the manifold 7, in the housing 17. The reactant gas introduction member 23 causes the oxygen containing gas to flow at the sides of the fuel cells 3 from lower toward upper end portions of the fuel cells 3.

Here, by burning the excess fuel gas exhausted through the gas channels of the fuel cells 3 and the oxygen containing gas on the upper end portion side of the fuel cells 3, start-up of the cell stack device 1 can be accelerated and the reformer 18 above the cell stacks 2 can be warmed. Thus, reforming reaction can be efficiently performed by the reformer 18.

In such a module 16, as mentioned above, the cell stack device 1, the power generation efficiency of which is improved, is housed in the housing 17. Thus, the power generation efficiency of the module 16 can be improved.

Although the fuel cells 3 are of the hollow flat type in FIG. 2, the fuel cells 3 may be, for example, of a cylindrical type or a flat plate type. In such cases, the structure of the module 16 can be appropriately changed to conform to the shape of the fuel cells 3.

FIG. 3 is an exploded perspective view illustrating an example of a fuel cell device 24 according to the present invention. Some structures are omitted from FIG. 3.

In the fuel cell device 24 illustrated in FIG. 3, an exterior casing includes support bars 25 and exterior plates 26, and the inside of the exterior casing is separated in the up-down direction by a separator plate 27. A module housing chamber 28 is formed on the upper side of the exterior casing and houses the above-described module 16. An auxiliary device housing chamber 29 is formed on the lower side of the exterior casing and houses auxiliary devices to operate the module 16. The auxiliary devices in the auxiliary device housing chamber 29 are omitted from the drawing.

An air circulation port 30 is provided in the separator plate 27. Air in the auxiliary device housing chamber 29 flows into the module housing chamber 28 side through the air circulation port 30. An air outlet port 31 is provided in part of one of the exterior plates 26, which is part of the module housing chamber 28. Air in the module housing chamber 28 is exhausted through the air outlet port 31.

In such a fuel cell device 24, as described above, the module 16 that includes the cell stack device 1, the power generation efficiency of which is improved, is housed in the module housing chamber 28. Thus, the fuel cell device 24 can stably generates power for a long time.

Although the present invention has been described in detail, the present invention is not limited to the examples of the embodiment described above, and various changes, modifications, and the like can be made without departing from the gist of the present invention.

For example, when the fuel cells 3 are of a hollow flat type that includes gas channels through which the oxygen containing gas flows, similar effects can be obtained. That is, also in a cell stack device using solid oxide fuel cells as the fuel cells 3, the similar effects can be obtained. The solid oxide fuel cells are each formed by sequentially stacking an air electrode layer serving as the inner electrode, a solid electrolyte layer, and a fuel electrode layer serving as the outer electrode layer.

REFERENCE SIGNS LIST

1: cell stack device
2: cell stack
3: fuel cell
16: fuel cell module
24: fuel cell device
A, B, C: fuel cell group

The invention claimed is:

1. A method of fabricating a cell stack device, the method comprising the steps of:
    fabricating a plurality of fuel cells that each include a gas channel through which a reactant gas flows;
    measuring a pressure loss of each of the fuel cells having been fabricated;
    grouping the plurality of fuel cells into a plurality of fuel cell groups in accordance with the measured pressure loss values; and
    forming a cell stack by arranging the fuel cell groups, into which the fuel cells are grouped, such that average pressure loss values of the fuel cell groups increase sequentially from a central portion to an end portion side in a fuel cell arrangement direction.

2. The method of fabricating the cell stack device according to claim 1,
    wherein the step of grouping of the plurality of fuel cells into the plurality of fuel cell groups in accordance with the measured pressure loss values includes the steps of
        classifying the plurality of fuel cells, the pressure loss values of which have been measured, into a plurality of classes set for respective specified pressure loss ranges, and
        forming the fuel cell groups of fuel cells that have been classified into the classes.

* * * * *